(12) United States Patent
Teague (10) Patent No.: US 12,529,722 B1
(45) Date of Patent: Jan. 20, 2026

(54) SYSTEMS AND METHODS FOR TRIGGERING OPTICALLY-CONTROLLED SEMICONDUCTOR DEVICES (71) Applicant: The Government of the United States, as represented by the Secretary of the Air Force, Wright-Patterson AFB, OH (US)

(72) Inventor: Joseph D. Teague, Tijeras, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/444,833

(22) Filed: Feb. 19, 2024

Related U.S. Application Data (63) Continuation of application No. 17/467,045, filed on Sep. 3, 2021, now Pat. No. 11,693,043.

(51) Int. Cl.
G01R 31/26 (2020.01)
G01R 1/073 (2006.01)

(52) U.S. Cl.
CPC ..... *G01R 31/2601* (2013.01); *G01R 1/07314* (2013.01)

(58) Field of Classification Search
CPC .................. G01R 31/2601; G01R 1/07314
See application file for complete search history.

(56) References Cited

U.S. PATENT DOCUMENTS

| 3,838,278 A | * | 9/1974 | Duguay | H04J 14/08 250/227.12 |
| 4,347,437 A | | 8/1982 | Mourou | |
| 5,142,224 A | | 8/1992 | Smith et al. | |
| 5,153,442 A | * | 10/1992 | Bovino | H03K 3/57 250/214.1 |
| 5,384,798 A | | 1/1995 | Zucker et al. | |
| 5,754,714 A | * | 5/1998 | Suzuki | G02F 2/004 385/5 |
| 5,900,937 A | * | 5/1999 | Wang | G01B 11/0608 356/511 |
| 6,191,654 B1 | | 2/2001 | Ikeuchi et al. | |
| 7,173,295 B1 | | 2/2007 | Mar et al. | |

(Continued)

*Primary Examiner* — Eman A Alkafawi
*Assistant Examiner* — Courtney G Mcdonnough
(74) *Attorney, Agent, or Firm* — AFMCLO/JAZ; Richard M. Mescher (57) ABSTRACT A system for triggering optically-controlled semiconductor devices, such as photoconductive semiconductor switches (PCSSs), in a defined order includes at least two optically-controlled semiconductor devices, an optical trigger selectively projecting an optical beam therefrom, wherein the optical beam is compatible with the at least two optically-controlled semiconductor devices to trigger the at least two optically-controlled semiconductor devices, and at least one a beam splitter positioned to split the optical beam into at least two split optical beams with each of the at least two split optical beams directed toward a different one of the at least two optically-controlled semiconductor devices. Each optical path from the optical trigger to one of the at least two optically-controlled semiconductor devices has a different length so that each of the at least two optically-controlled semiconductor devices are triggered with defined time differentials.

14 Claims, 5 Drawing Sheets (56) References Cited

U.S. PATENT DOCUMENTS

| | | |
|---|---|---|
| 10,403,780 B2 | 9/2019 | Jang |
| 2014/0291480 A1 | 10/2014 | Bruder et al. |
| 2019/0033277 A1 | 1/2019 | Motayed et al. |
| 2020/0021077 A1* | 1/2020 | Molter ................ H01S 3/06712 |

* cited by examiner

SYSTEMS AND METHODS FOR TRIGGERING OPTICALLY-CONTROLLED SEMICONDUCTOR DEVICES

Pursuant to 37 C.F.R. § 1.78(a)(4), this application is a continuation-in-part of U.S. Non-Provisional patent application Ser. No. 17/647,045 filed on Jan. 5, 2022, now U.S. Pat. No. 11,906,754 issued on Feb. 20, 2024, which in turn (1) claims the benefit under 35 U.S.C. § 119(e) of U.S. Provisional Patent Application Ser. No. 63/151,877, filed on Feb. 22, 2021, and (2) pursuant to 37 C.F.R. § 1.78(a)(4) is a continuation-in-part of U.S. Non-Provisional patent application Ser. No. 17/647,037 filed on Jan. 5, 2022, which in turn claims the benefit under 35 U.S.C. § 119(e) of U.S. Provisional Patent Application Ser. No. 63/151,874, filed on Feb. 22, 2021, the entire contents of which are each expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to optical-controlled semiconductor devices and, more particularly, to a method of using optical path length differences, to trigger optically-controlled semiconductor devices at different times from a single optical trigger or source with an ultra-high degree of precision.

BACKGROUND OF THE INVENTION

Many optically-controlled semiconductor devices such as, for example but not limited to photoconductive semiconductor switches (PCSSs) require an optical trigger to activate. To build more complex circuits, such as those formed by replacing transistors in traditional circuit designs with PCSSs, requires that either each PCSS have its own optical trigger source, which greatly increases design complexity, or the PCSS be triggered simultaneously if using the same optical trigger or source, which reduces the number of usable circuit designs.

Additionally, if operating in a non-linear mode, there is not a known way to turn the circuit off without disconnecting the electrical source and doing that at high speeds (e.g. sub 1 ns) is difficult to achieve with current technology. Accordingly, there is a need for improved systems and methods for controlling optically-controlled semiconductor devices.

SUMMARY OF THE INVENTION

The present invention overcomes the foregoing problems and other shortcomings, drawbacks, and challenges of high-speed switching or triggering of optically-controlled semiconductor devices. This invention enables the use of optically-controlled semiconductor devices without requiring more than one optical trigger or source. The present invention allows for the deliberate timing and activation of multiple optically-controlled semiconductor devices from a single optical trigger or source through the design and fine-tuning of optical path-lengths between the optical trigger or source and the optically-controlled semiconductor devices. This allows for picosecond timing precision, which was previously impossible for high-power electrical circuits.

This invention may be used, for example but not limited to, in the directed energy, pulsed power, medical, and high energy physics fields. It may also be used in electrical power conversion (AC/DC or DC/DC) and isolation.

While the invention will be described in connection with certain embodiments, it will be understood that the invention is not limited to these embodiments. To the contrary, this invention includes all alternatives, modifications, and equivalents as may be included within the spirit and scope of the present invention. According to one disclosed embodiment of the present invention, a triggering system comprises at least two optically-controlled semiconductor devices, an optical trigger selectively projecting an optical beam therefrom, wherein the optical beam is compatible with the at least two optically-controlled semiconductor devices to trigger the at least two optically-controlled semiconductor devices, and at least one a beam splitter positioned to split the optical beam into at least two split optical beams with each of the at least two split optical beams directed toward a different one of the at least two optically-controlled semiconductor devices. Each optical path from the optical trigger to one of the at least two optically-controlled semiconductor devices has a different length so that each of the at least two optically-controlled semiconductor devices are triggered with defined time differentials.

According to another disclosed embodiment of the present invention, a method for triggering optically-controlled semiconductor devices in a defined order comprising the steps of providing two or more optically-controlled semiconductor devices and an optical trigger compatible with the two or more optically-controlled semiconductor devices, projecting an optical beam from the optical trigger, and splitting the optical beam into two or more optical paths toward the two or more two or more optically-controlled semiconductor devices. Each of the two or more optical paths has a different length such that each of the two or more two or more optically-controlled semiconductor devices are triggered with defined time differentials.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Figure 1:
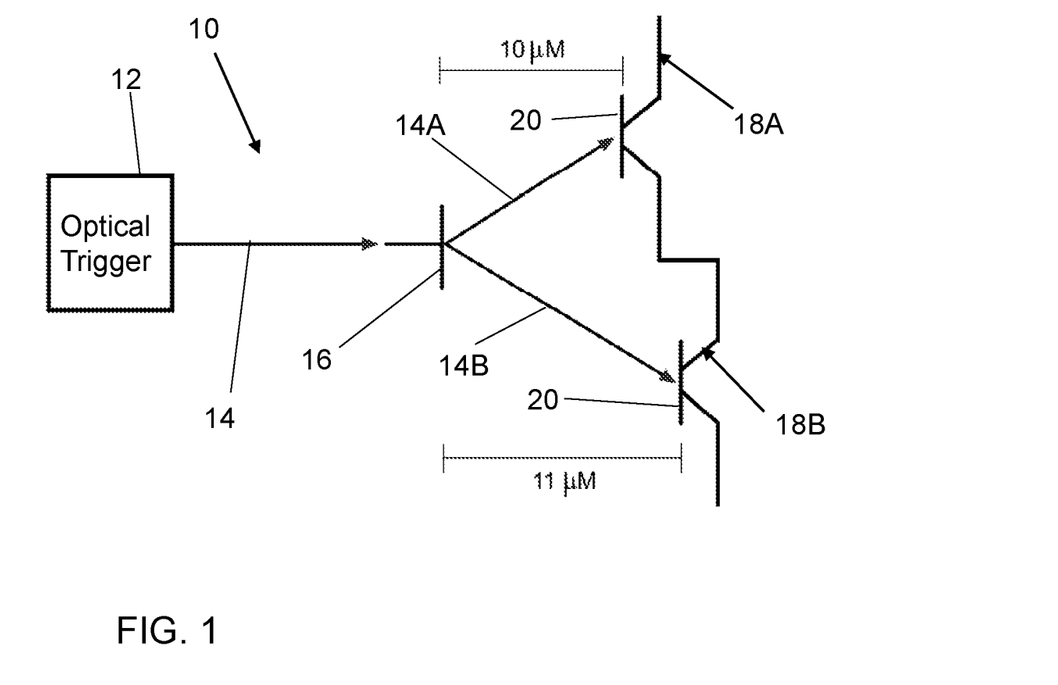
FIG. 1 illustrates differential triggering of two or more optically-controlled semiconductor devices based on different path lengths from an optical trigger or source to the two or more optically-controlled semiconductor devices.

FIG. 1 illustrates an optical triggering system 10 that comprises a single optical trigger or source 12 that produces a beam of light or other electromagnetic radiation 14, at least one beam splitter 16 that receives the beam 14 and splits the beam 14 into two split beams 14A, 14B, and at least two optically-controlled semiconductor devices 18 each receiving one of the split beams 14A, 14B. It is noted that the optical triggering system 10 can alternatively have any other suitable configuration.

Optically-controlled semiconductor devices 18 are controlled by light or other electromagnetic radiation conditions (such as the presence or lack of presence of specified light at a sensitive surface 20) rather than the presence of specified electrical conditions (such as a specified voltage or current). Optically-controlled semiconductor devices 18 are typically sensitive to a range of optical wavelengths. The optical spectrum extends from longer wavelength infrared (IR) to shorter wavelength ultraviolet (UV) with visible wavelengths located in between. It is noted that the optically-controlled semiconductor devices could be sensitive to wavelengths outside the range of optical wavelengths if desired. Optically-controlled semiconductor devices 18 are typically specified to trigger within a specific wavelength range but could alternatively or additionally be specified to trigger within a specific frequency range and/or a specific intensity range. The term "trigger" is used herein and in the claims to mean causing a change in operation, property, or the like to happen or exist in the optically-semiconductor device 18. For example, but not limited to, providing a specified wavelength at the sensitive surface 20 of a photoconductive semiconductor switch (PCSS) changes the switch from open to closed, providing a specified wavelength and intensity of light to a sensitive surface 20 of a photo resistor changes its resistance from a first resistance to a second resistance, and the like.

The optical trigger or source 12 can be, for example but not limited to, a light emitting diode (LED), a laser diode (LD), laser diode arrays (LDA), a laser, or any other suitable source of light or other electromagnetic radiation. The beam 14 can be modulated to trigger the optically-controlled semiconductor devices 18 in a desired manner. The modulation can be, for example but not limited to, turning the beam 14 on and off in a desired manner, linearly varying the beam 14 in intensity between two predetermined levels, or the like. The beam 14 should have suitable properties such as, for example but not limited to, wavelength, intensity, and the like to trigger the optically-controlled semiconductor devices 18. It is noted that the optical trigger 12 can alternatively be of any other suitable type and/or alternatively have any other suitable configuration.

The term "beam splitter" is used herein and in the claims to mean a device for dividing light or other electromagnetic radiation into two or more separate beams. The at least one beam splitter 16 can be, for example but not limited to, triangular prism(s), partially-reflective mirror(s) with a metallic coating or a dichromic coating, dichromic mirrored prism(s), reflections from lens(es), fiber coupling or splitter to n # of fibers (when optical fibers are utilized), a polarizing beam splitter, and/or any other suitable method of beam splitting. It is noted that the beam splitter can alternatively be of any other suitable type.

Figure 1A:
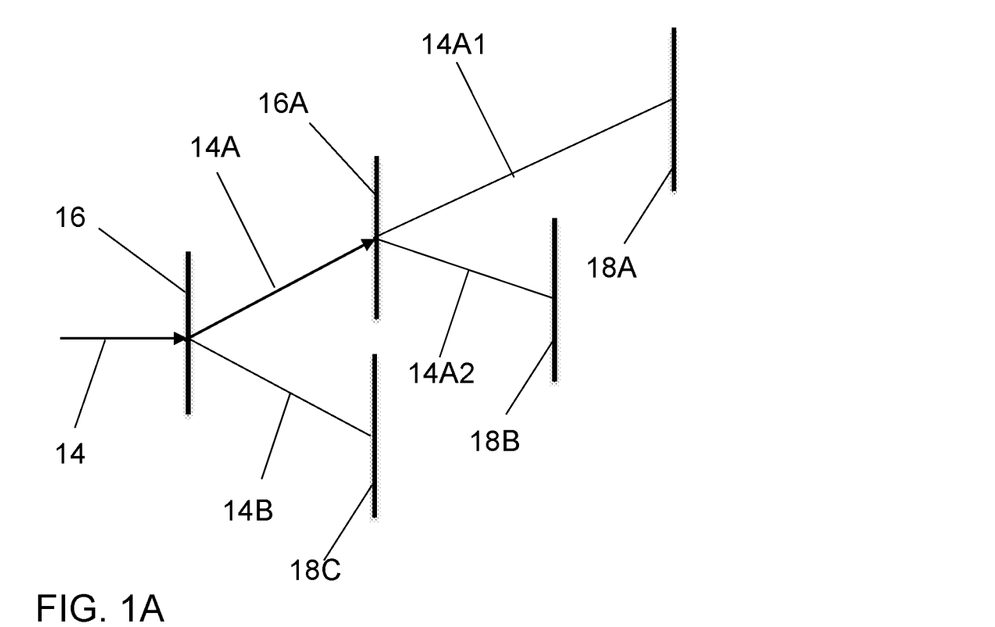
FIG. 1A illustrates that there can be more than one beam splitter utilized when there are more than two of the two or more optically-controlled semiconductor devices.
Figure 1B:
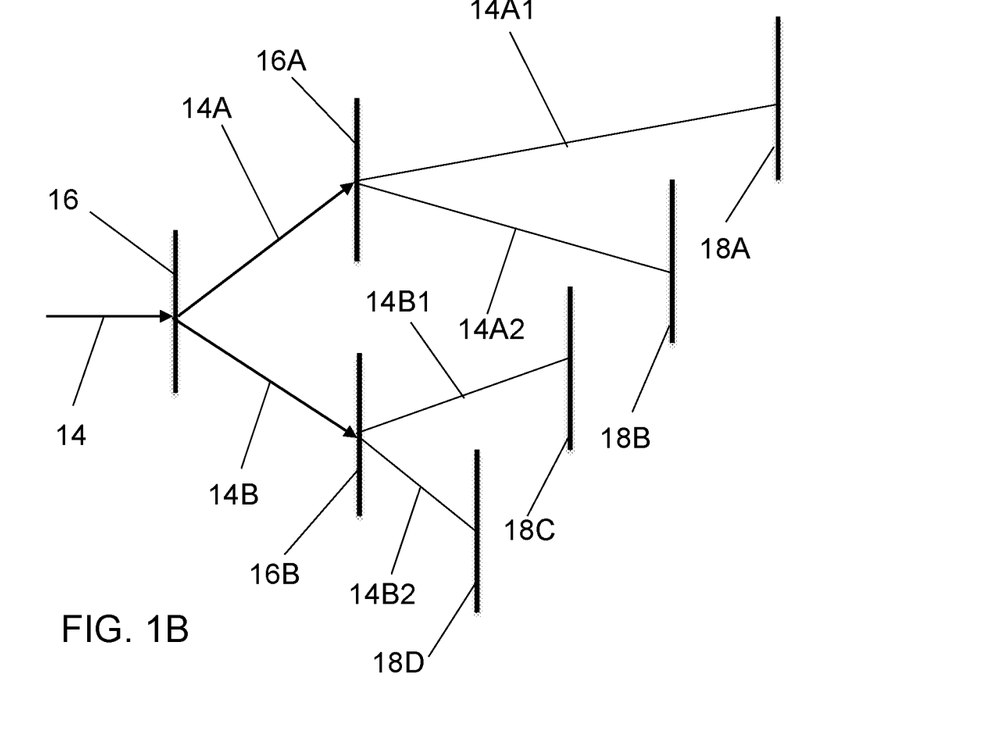
FIG. 1B illustrates that there can be more than two beam splitters utilized when there are more than three of the two or more optically-controlled semiconductor devices.
Figure 1C:
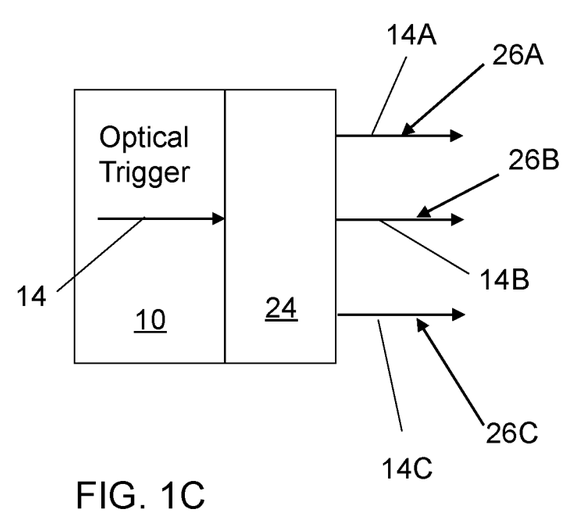
FIG. 1C illustrates that there can be a single beam splitter utilized when there are more than two of the two or more optically-controlled semiconductor devices.
Figure 1D:
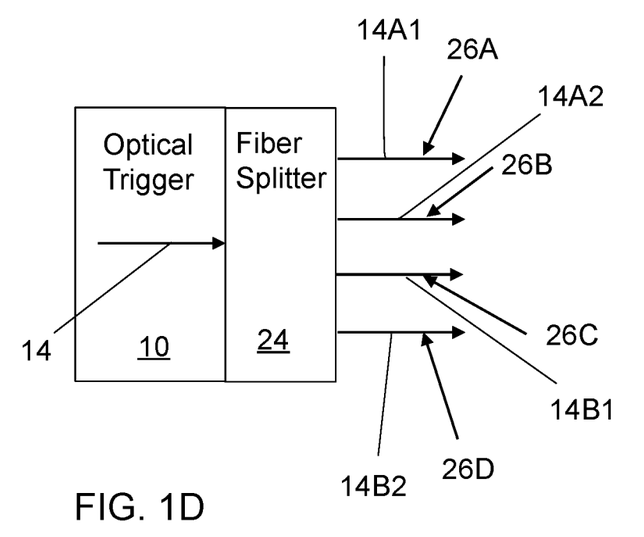
FIG. 1D illustrates that there can be a single beam splitter utilized when there are more than three of the two or more optically-controlled semiconductor devices.

If it is desired to trigger more than two optically-controlled semiconductor devices 18, more than one beam splitter 16 may be used. For example, if it is desired to trigger three optically-controlled semiconductor devices 18A, 18B, 18C, the primary beam 14 is directed to the first beam splitter 16 and is split into two split beams 14A, 14B. One of those two split beams 14A may then be directed to another beam splitter 16A and split in two, creating a total of three split beams 14A1, 14A2, 14B (best shown in FIG. 1A). Alternatively, a single fiber coupling or splitter 24 can be utilized to split the beam 14 into three split beams 14A, 14B, 14C within separate optical fibers 26A, 26B, 26C (best shown in FIG. 1C). Likewise, if it is desired trigger four optically-controlled semiconductor devices 18A, 8B, 18C, 18D, both of the two split beams 14A, 14B may then be directed to separate beam splitters 16A, 16B and split in two, creating a total of four split beams 14A1, 14A2, 14B1, 14B2 (best shown in FIG. 1B). Alternatively, a single fiber coupling or splitter 24 can be utilized to split the beam 14 into four separate split beams 14A1, 14A2, 14B1, 14B2 within four separate optical fibers 26A, 26B, 26C, 26D (best shown in FIG. 1D). It is noted that the beam splitter(s) 16 can alternatively have any other suitable configuration.

The optically-controlled semiconductor devices 18 can be, for example but not limited to, PCSSs, photo diodes, optical field effect transistors (FETs), other photo transistors, photo thyristors, photo resistors, and the like. It is noted that the optically-controlled semiconductor device 18 can alternatively be of any other suitable type and/or can alternatively have any other suitable configuration.

A PCSS is an optically-controlled semiconductor device 18 having a semiconductor material that conducts electricity when triggered by the beam of light 14 and does not conduct electricity when not triggered by the beam of light 14. In most types of PCSSs, the electrical conduction ceases or rapidly decays once the beam of light 14 is turned off. See, for example, U.S. Non-Provisional patent application Ser. No. 17/647,037 filed on Jan. 5, 2022, and titled "STACKED THIN-FILM PHOTOCONDUCTIVE SEMICONDUCTOR SWITCH", the disclosure of which is expressly incorporated herein in its entirety by reference.

A photo diode is a semiconductor diode sensitive to photon radiation, such as visible light, infrared or ultraviolet radiation, X-rays, and gamma rays. It produces an electrical current when it absorbs photons. See. For example, U.S. Patent Application Publication No. 2010/0127314A1 published on May 27, 2010, and titled "PHOTODIODES AND FABRICATION THEREOF", U.S. Pat. No. 9,466,747 issued on Oct. 11, 2016, and U.S. Pat. No. 10,903,176 issued on Jan. 16, 2021, and titled "METHOD OF MAKING A PHOTODIODE", the disclosures of which are expressly incorporated herein in their entireties by reference.

A controlled FET can have a semiconductor structure configured to form a voltage controlled, normally on, high voltage FET and a photoconductive region configured to reduce a gate-to-source voltage of the FET in response to light incident upon the photoconductive region. See, for example, U.S. Non-Provisional patent application Ser. No. 17/931,067 filed on Sep. 9, 2022, and titled "OPTICALLY CONTROLLED FIELD EFFECT TRANSISTOR", the disclosure of which is expressly incorporated herein in its entirety by reference.

Many other types of transistors are optically controlled. See, for example, U.S. Pat. No. 9,356,178 issued on May 31, 2016, and titled "PLASMONIC PHOTOTRANSISTOR", U.S. Pat. No. 11,430,905 issued on Aug. 30, 2022, and titled "HETERO-JUNCTION PHOTOTRANSISTOR", and U.S. Pat. No. 11,885,674 issued on Jan. 30, 2024, and titled "PHOTOTRANSISTOR AND METHOD OF OPERATING THE PHOTOTRANSISTOR APPARATUS", the disclosures of which are expressly incorporated herein in their entirety by reference.

There are two types of optical thyristors: light-activated Silicon Controlled Rectifiers (LASCRs) and photo-TRIACs. LASCRs are semiconductor relays that permit current flow in only one direction when triggered by light. Photo-TRIACS are semiconductor relays that permit current flow in both directions when triggered by light. A photo resistor (also known as a light-dependent resistor (LDR)) is a passive component that decreases resistance with respect to receiving light on a sensitive surface 20. See, for example, U.S. Pat. No. 4,757,367 issued on Jul. 12, 1988, and titled "LIGHT TRIGGERED SEMICONDUCTOR DEVICE WITH DETACHABLE AUXILIARY THYRISTOR", the disclosure of which is expressly incorporated herein in its entirety by reference.

A photo resistor is less light-sensitive than a photo diode or a photo transistor because a photo resistor is a passive component that typically does not have a PN-junction. See, for example, U.S. Pat. No. 3,208,022 issued on Sep. 21, 1965, and titled "HIGH PERFORMANCE PHOTORESISTOR" and U.S. Pat. No. 10,944,066 issued on Mar. 9, 2021, and titled "PHOTORESISTOR WITH IMPROVED SENSITIVITY", the disclosures of which are expressly incorporated herein in their entirety by reference.

The semiconductor materials of the optically-controlled semiconductor devices 18 may include GaN, GaAs, SiC, AlN, and $Ga_2O_3$, as well as Si, C (diamond), and SiC. Contact materials may include any contact that has good adhesion to the chosen optically-controlled semiconductor device 18. It is noted that any other suitable materials can additionally and/or alternatively be utilized.

By carefully selecting and determining a distance the beam 14 from the optical trigger 12 travels to the two or more optically-controlled semiconductor devices 18A, 18B, the two or more optically-controlled semiconductor devices 18A, 18B may be triggered with picosecond precision in the time-domain. For example, if the optically-controlled semiconductor devices 18A, 18B are two PCSSs which are triggered by the same optical trigger 12, and the path to the second one of the PCSSs is 100 mm longer than the path to the first one of the PCSSs 18A, the second switch 18B will trigger 330 ps after the first one of the PCCs 18A. The general equation is: $d=\Delta t*c$ where $\Delta t$ is the desired time delay, d is the path length difference, and c is the speed of light. Minimum time delay may be limited by the response time of the PCSSs 18A, 18B, which typically have a 10-90 rise time, i.e. 10% to 90% of peak current, of ~150 ps.

It is important that the desired timing offset is defined and established from the first optically-controlled device 18 triggered to each of the succeeding optically controlled devices 18. Once that offset is known, it is necessary to determine the necessary optical path lengths to each of the optically controlled devices 18 to ensure that the beam 14 from the optical trigger 12 takes the desired longer time to reach the second optically controlled device 18B, and subsequent optically controlled devices if any. An example of a 1-micron optical path length difference (3.3 fs delay) is shown in FIG. 1. This difference in optical path lengths is more important than the overall optical path length. This optical path may be contained within an optical fiber, routed through mirrors and/or lenses in free space, or a combination of the two. The exemplary embodiment shown in FIG. 1 is one possibility. However, the beam 14 may be split and directed through multiple other methods. The simplest method is to use a triangular prism type beam splitter 14 and physically offset the optically-controlled semiconductor devices 18 a desired distance from the beam splitter 14 to obtain the desired time offset. However, this may be accomplished way such a, for example but not limited to, optical fibers of differing lengths, reflections from mirrors, and the like.

Figure 2:
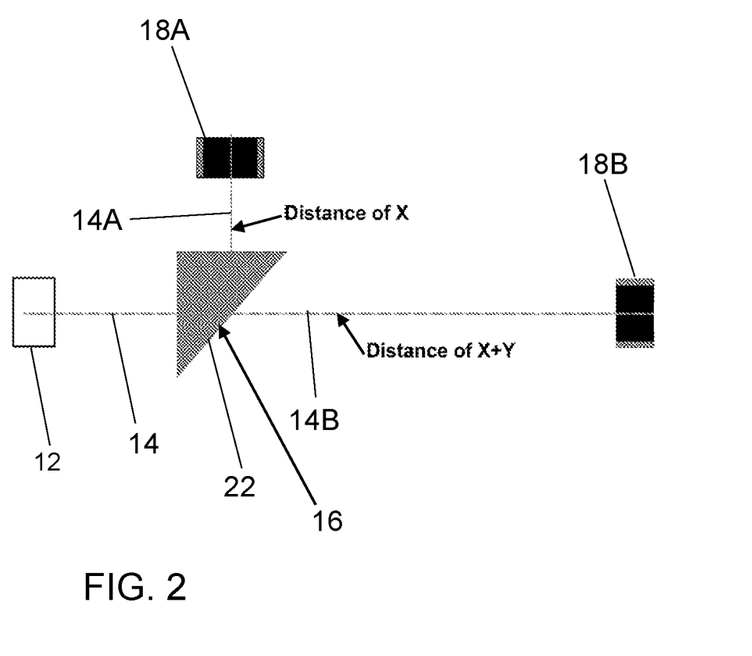
FIG. 2 illustrates differential switching of two photoconductive semiconductor switches (PCSS) based on different path lengths from the laser or optical source to the PCSSs, using a prism or beam splitter.

FIG. 2 illustrates the general principle of differing optical path lengths for the beam 14 from the optical trigger 12. The beam of light 14 from the optical trigger 12 is directed to a beam splitter 16 in the form of a triangular prism 22 which perpendicularly sends a first split beam 14A toward a first optically controlled device 18A and passes a second split beam 14B toward a second optically controlled device 18B. The delay or difference between the actuation of each optically-controlled device 18A, 18B is determined by the difference in the optical path lengths, which is distance Y.

Figure 3:
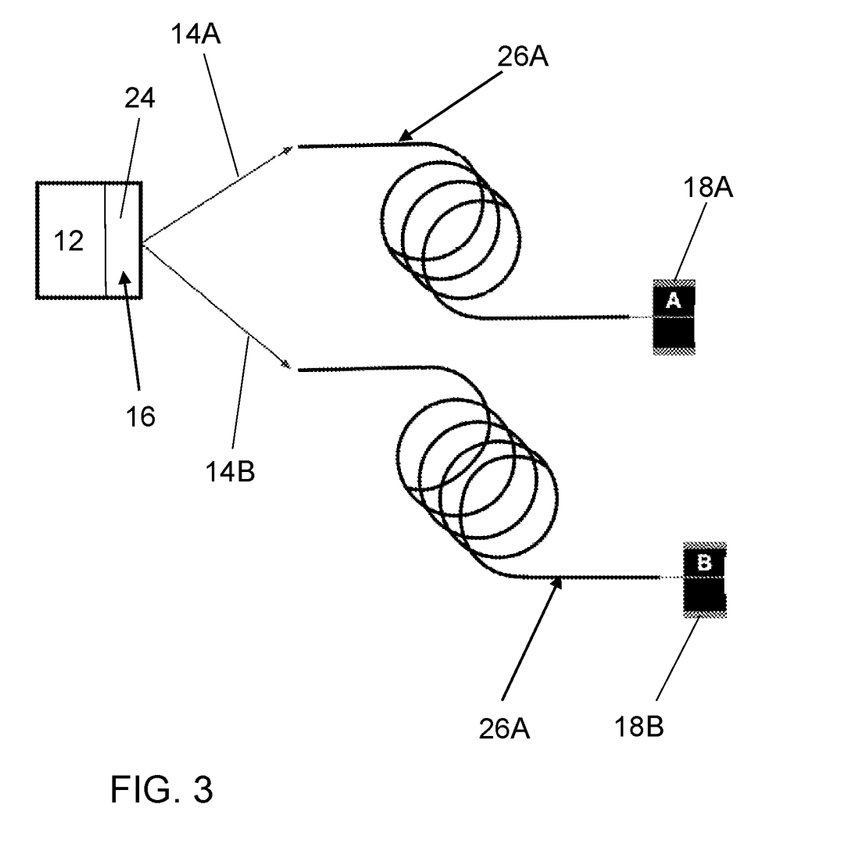
FIG. 3 illustrates differential switching of two photoconductive semiconductor switches (PCSS) based on different path lengths from the laser or optical source to the PCSSs using different lengths of optical fibers to define the path lengths.

FIG. 3 illustrates an exemplary embodiment of the invention having a beam splitter in the form of an optical fiber coupling or splitter 26 that is coupled to two separate optical fibers 26A, 25B of differing lengths. In this case, the first optical fiber path defined by the first optical fiber 26A is slightly longer than the second optical fiber path defined by the second optical fiber 26B. Accordingly, the first optically-controlled device 18A will be triggered before the second optically-controlled semiconductor device 18B.

The optical path lengths may be controlled and altered by a number of techniques including, but not limited to, employing optical fibers 26 of different lengths to each of the optically-controlled semiconductor devices 18, placing one or more the optically-controlled semiconductor devices 18 on a translation stage, placing one or more reflective optics on a translation stage, and transmitting one or more beams 14 through a solid having a higher index of refraction than other the paths of the beam(s) 14. This last technique does not change the optical path length, but rather slows the beam(s) of light down.

Other methods of controlling the optical path lengths may include: manufacturing a system with defined fixed optical path lengths, whether via hard mounted optics 12, 16 and optically-controlled semiconductor devices 18, or fixed length optical fibers 26 extending between the optics 23, 26 and the optically-controlled semiconductor devices 18; computer-controlled translation stages for the optics 12, 16 and/or the optically-controlled semiconductor devices 18; and/or manually-controlled translation stages for the optics 12, 16 and/or the optically-controlled semiconductor devices 18.

There are many uses for the systems and methods of the present invention. For example but not limited to, when the optically-controlled semiconductor devices are a PCSS, high-voltage (>1200V) switching, high-amperage (>100 A) switching, ultra-fast (>1 MHz) switching, ultra-short pulse (<1ns) switching, DC circuit protection, EMP/EMI generation, RF generation, particle beam generation, and transistor replacement.

PCSS embodiments of the present invention may also be a replacement for spark gap and conventional transistor switches in high-voltage applications. When it is desired that the PCSS 18 conduct current, a signal to turn on the optical source 12 is sent. When the photons from the optical source 12 impact the PCSS 18, the PCSS 18 turns from a nonconductive "off" state into a conductive "on" state. Depending on the mode of operation of the PCSS 18, it will either conduct electricity until the voltage supplied to it drops below a certain level, or it will stop conducting when the optical source 12 is turned off. The use of optical path length differences allows for heretofore unseen precision in high-power switching.

Multiple wide bandgap semiconductors may be used for the optically-controlled semiconductor devices of the present invention, including but not limited to GaAs, GaN, and AlN. All of these materials exhibit both linear and non-linear modes of operation. A variety of optical triggers or sources 12 may be used as long as they provide enough energy at the correct wavelength, frequency, and/or intensity for a given material. GaAs is a suboptimal choice however, given it lacks durability compared to GaN or AlN.

The disclosed systems and methods of the present invention may also be used to provide "hardening" to an electronic system, reducing its electromagnetic susceptibility when used in place of a traditional transistor.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A triggering system comprising:
    at least two optically-controlled semiconductor devices;
    an optical trigger selectively projecting an optical beam therefrom, wherein the optical beam is compatible with the at least two optically-controlled semiconductor devices to trigger the at least two optically-controlled semiconductor devices;
    at least one a beam splitter positioned to split the optical beam into at least two split optical beams with each of the at least two split optical beams directed toward a different one of the at least two optically-controlled semiconductor devices;
    wherein the at least two optically-controlled semiconductor devices are each one of a photo diode, an optical field effect transistor (FET), a photo transistor, a photo thyristor, and a photo resistor; and
    wherein each optical path from the optical trigger to one of the at least two optically-controlled semiconductor devices has a different length so that each of the at least two optically-controlled semiconductor devices are triggered with defined time differentials and operated for defined periods of time; and
    wherein the optical path lengths are controlled and/or altered by at least one of the at least two optically-controlled semiconductor devices being positioned on at least one translation stage to selectively change the defined time differentials of the at least two optically-controlled semiconductor devices by moving the at least one of the at least two optically-controlled semiconductor devices using at least one translation stage.

2. The trigger system according to claim 1, wherein each of the at least two optically-controlled semiconductor devices includes a sensitive surface for receiving one of the split optical beams to trigger the optically-controlled semiconductor device.

3. The trigger system according to claim 1, wherein the length of each of the optical paths is defined by the speed of light from the optical trigger along the two or more paths.

4. The trigger system according to claim 1, wherein each of the optical paths includes at least one of: an optical fiber; a mirror arrangement; and a lens arrangement.

5. The trigger system according to claim 1, wherein the beam splitter includes at least one of: a partially-reflective mirror; a reflective lens; an optical fiber coupling; and a polarizing beam splitter.

6. A method for triggering optically-controlled semiconductor devices in a defined order, the method comprising the steps of:
    providing two or more optically-controlled semiconductor devices and an optical trigger compatible with the two or more optically-controlled semiconductor devices;
    wherein the at least two optically-controlled semiconductor devices are each one of a photo diode, an optical field effect transistor (FET), a photo transistor, a photo thyristor, and a photo resistor;
    projecting an optical beam from the optical trigger; and
    splitting the optical beam into two or more optical paths toward the two or more two or more optically-controlled semiconductor devices, wherein each of the two or more optical paths has a different length such that each of the two or more two or more optically-controlled semiconductor devices are triggered with defined time differentials and operated for defined periods of time,
    wherein at least one of the at least two optically-controlled semiconductor devices is positioned on at least one translation stage; and
    selectively changing the defined time differentials of the at least two optically-controlled semiconductor devices by selectively moving the at least one of the at least two optically-controlled semiconductor devices using the translation stage.

7. The method for triggering optically-controlled semiconductor devices in a defined order according to claim 6, wherein each of the at least two optically-controlled semiconductor devices includes a sensitive surface for receiving one of the split optical beams to trigger the optically-controlled semiconductor device.

8. The method for triggering optically-controlled semiconductor devices in a defined order according to claim 6, further comprising the step of defining length of each of the two or more optical paths with the speed of light from the optical trigger along the two or more optical paths.

9. The method for triggering optically-controlled semiconductor devices in a defined order according to claim 6, wherein the optical path includes at least one of an optical fiber, a mirror arrangement, and a lens arrangement.

10. The method for triggering optically-controlled semiconductor devices in a defined order according to claim 6, wherein splitting the optical beam includes using at least one of a partially-reflective mirror, reflection off a lens, and a polarizing beam splitter.

11. The trigger system according to claim 1, wherein the at least one translation stage is a computer-controlled translation stage.

12. The trigger system according to claim 1, wherein the at least one translation stage is a manually-controlled translation stage.

13. The trigger system according to claim 6, wherein the at least one translation stage is a computer-controlled translation stage.

14. The trigger system according to claim 6, wherein the at least one translation stage is a manually-controlled translation stage.

* * * * *